(12) United States Patent
Dufford et al.

(10) Patent No.: US 10,848,387 B2
(45) Date of Patent: Nov. 24, 2020

(54) GEO-SPATIAL MAPPING AND SERVICE PROVISION ANALYSIS

(71) Applicant: Cox Communications, Inc., Atlanta, GA (US)

(72) Inventors: Connie Ann Dufford, Marietta, GA (US); Daniel Michael Hoffman, Roswell, GA (US); Trip McCabe, Johns Creek, CA (US); Bruce Beeco, Buford, GA (US)

(73) Assignee: Cox Communications, Inc., Atlanta, GA (US)

(*) Notice: Subject to any disclaimer, the term of this patent is extended or adjusted under 35 U.S.C. 154(b) by 1120 days.

(21) Appl. No.: 14/853,641

(22) Filed: Sep. 14, 2015

(65) Prior Publication Data
US 2016/0006618 A1 Jan. 7, 2016

Related U.S. Application Data

(62) Division of application No. 12/970,528, filed on Dec. 16, 2010, now abandoned.

(51) Int. Cl.
*H04L 12/24* (2006.01)
*G06Q 10/06* (2012.01)
(Continued)

(52) U.S. Cl.
CPC ......... *H04L 41/145* (2013.01); *G06Q 10/063* (2013.01); *G06Q 10/06315* (2013.01);
(Continued)

(58) Field of Classification Search
CPC ............ H04L 41/1454; H04L 41/5058; G06Q 10/063; G06Q 30/0247; G06Q 10/06315; H04W 16/18
See application file for complete search history.

(56) References Cited

U.S. PATENT DOCUMENTS

| | | | |
|---|---|---|---|
| 6,414,635 B1* | 7/2002 | Stewart | G01S 5/12 342/457 |
| 6,760,310 B1* | 7/2004 | Sofman | H04L 41/145 370/238 |

(Continued)

OTHER PUBLICATIONS

Mobile service platform: A middleware for nomadic mobile service provisioning A van Halteren, P Pawar—Wireless and Mobile Computing . . . , 2006—ieeexplore.ieee.org (Year: 2006).*

(Continued)

*Primary Examiner* — Jonathan G Sterrett
(74) *Attorney, Agent, or Firm* — Merchant & Gould

(57) ABSTRACT

A Geo-spatial Enterprise Mapping System (GEMS) application may be utilized for determining a cost associated with providing a service to a point of interest by utilizing data from a web-based mapping service application in conjunction with data from a service provider database. Maps may be utilized with polylines representing fiber and coax spans, and markers to display device, customer, and prospect information to provide a user with a quick overview of a potential profitability of a particular area or point of interest. A proximity of customers and groups of customers to a service provider network may be displayed and visible to a user in an intuitive manner. A serviceability and profitability of potential customers may be determined, as well as locating prospective customers.

19 Claims, 7 Drawing Sheets

(51) Int. Cl.
*G06Q 30/02* (2012.01)
*H04W 16/18* (2009.01)

(52) U.S. Cl.
CPC ..... *G06Q 30/0247* (2013.01); *H04L 41/5058* (2013.01); *H04W 16/18* (2013.01)

(56) References Cited

U.S. PATENT DOCUMENTS

| | | | |
|---|---|---|---|
| 6,829,596 B1* | 12/2004 | Frazee | G06Q 20/0457 235/380 |
| 6,985,844 B1 | 1/2006 | Ernst et al. | |
| 7,516,156 B2* | 4/2009 | Klein | G06F 17/30893 702/5 |
| 8,073,720 B2* | 12/2011 | Egner | G06Q 10/063 705/7.11 |
| 8,082,335 B2 | 12/2011 | Mishra et al. | |
| 2002/0000999 A1 | 1/2002 | McCarty et al. | |
| 2003/0050048 A1* | 3/2003 | Abed | H04L 41/12 455/414.1 |
| 2003/0158765 A1* | 8/2003 | Ngi | G06Q 10/06312 705/7.22 |
| 2004/0143428 A1* | 7/2004 | Rappaport | G06F 17/509 703/22 |
| 2004/0203873 A1* | 10/2004 | Gray | H04W 48/08 455/456.1 |
| 2008/0233927 A1* | 9/2008 | Moon | G06F 17/3087 455/414.1 |
| 2008/0262897 A1* | 10/2008 | Howarter | G06Q 30/00 705/7.34 |
| 2010/0037126 A1 | 2/2010 | Andrews et al. | |
| 2010/0094548 A1 | 4/2010 | Tadman et al. | |
| 2010/0293620 A1 | 11/2010 | Harrison | |
| 2011/0158172 A1* | 6/2011 | Kande | H04L 41/0806 370/328 |
| 2011/0194456 A1* | 8/2011 | Fordham | H04L 41/145 370/254 |
| 2011/0320319 A1 | 12/2011 | Streich | |
| 2012/0041675 A1 | 2/2012 | Juliver et al. | |
| 2012/0084231 A1 | 4/2012 | McNaught et al. | |
| 2012/0158445 A1 | 6/2012 | Dufford et al. | |

OTHER PUBLICATIONS

A versatile genetic algorithm for network planning, A Riedl—Proceedings of EUNICE, 1998—Citeseer (Year: 1998).*
PON network designing algorithm for suboptimal deployment of optical fiber cables A Agata, Y Horiuchi—2009 Asia Communications and . . . , 2009—ieeexplore.ieee.org (Year: 2009).*
"Using adapted visibility graphs for network planning" B Lakic, M Hajduczenia, HJA da Silva . . .—. . . IEEE Symposium on . . . , 2008—ieeexplore.ieee.org (Year: 2008).*
Economics of fixed broadband access network strategies T Monath, N Kristian, P Cadro . . .—. . . Communications . . . , 2003—ieeexplore.ieee.org (Year: 2003).*
Modeling operational expenditures for telecom operators S Verbrugge, S Pasqualini, FJ Westphal . . .—. . . of Conference on . . . , 2005—129.69.170.1 (Year: 2005).*
A fair cost allocation scheme for CapEx and OpEx for a network service provider K Casier, S Verbrugge, R Meersman . . .—. . . of CTTE2006, the 5th . . . , 2006—biblio.ugent.be (Year: 2006).*
"A cost model for broadband access networks: FTTx versus WiMax", J PR Pereira—2007 Second International Conference on Access . . . , 2007—ieeexplore.ieee.org (Year: 2007).*

* cited by examiner

GEO-SPATIAL MAPPING AND SERVICE PROVISION ANALYSIS

CROSS REFERENCE TO RELATED APPLICATION

This application is a divisional of and claims priority to application Ser. No. 12/970,528, filed Dec. 16, 2010, entitled GEO-SPATIAL MAPPING AND SERVICE PROVISION ANALYSIS, which is hereby incorporated in its entirety by reference.

BACKGROUND

Physically expanding a service network infrastructure from a service provider backbone to an individual subscriber may be a costly undertaking, especially in remote areas. A service provider may conduct an analysis in order to assess recurring charges, nonrecurring charges, and build costs for a return on investment (ROI) metric to aid in determining if it may be cost effective to invest in expanding service coverage to a given point of interest (POI). Oftentimes, such an analysis is performed manually, wherein a service provider technician may drive to a POI. He/she may then walk from the POI to a nearest ingress to the service provider network, and record the distance. He/she may then enter the information into a computer system and make a determination as to whether or not there may be enough value for the service provider to pursue expanding service to the POI based on the cost of building out that service to the preexisting network. As can be appreciated, this process can be time-consuming and sometimes, inaccurate.

It is with respect to these and other considerations that the present invention has been made.

SUMMARY

Consistent with embodiments of the present invention, systems and methods are disclosed for determining a serviceability and profitability of potential customers (points of interest) and to locate prospective customers. A Geo-spatial Enterprise Mapping System (GEMS) application may be utilized for determining a cost associated with providing a service to a point of interest by utilizing data from a web-based mapping service application in conjunction with data from a service provider database. Embodiments provide for a calculation of an expected rate of return on an initial investment to connect a point of interest to a service provider network.

According to embodiments, maps may be utilized with polylines representing transmission fiber (e.g., wire and optical fiber) and coaxial cable spans, and markers to display device, customer, and prospective customer information to provide a user with a quick overview of a potential profitability of a particular area or point of interest. A proximity of customers and groups of customers to a service provider network may be displayed to a user in an intuitive manner.

DETAILED DESCRIPTION

Figure 1:
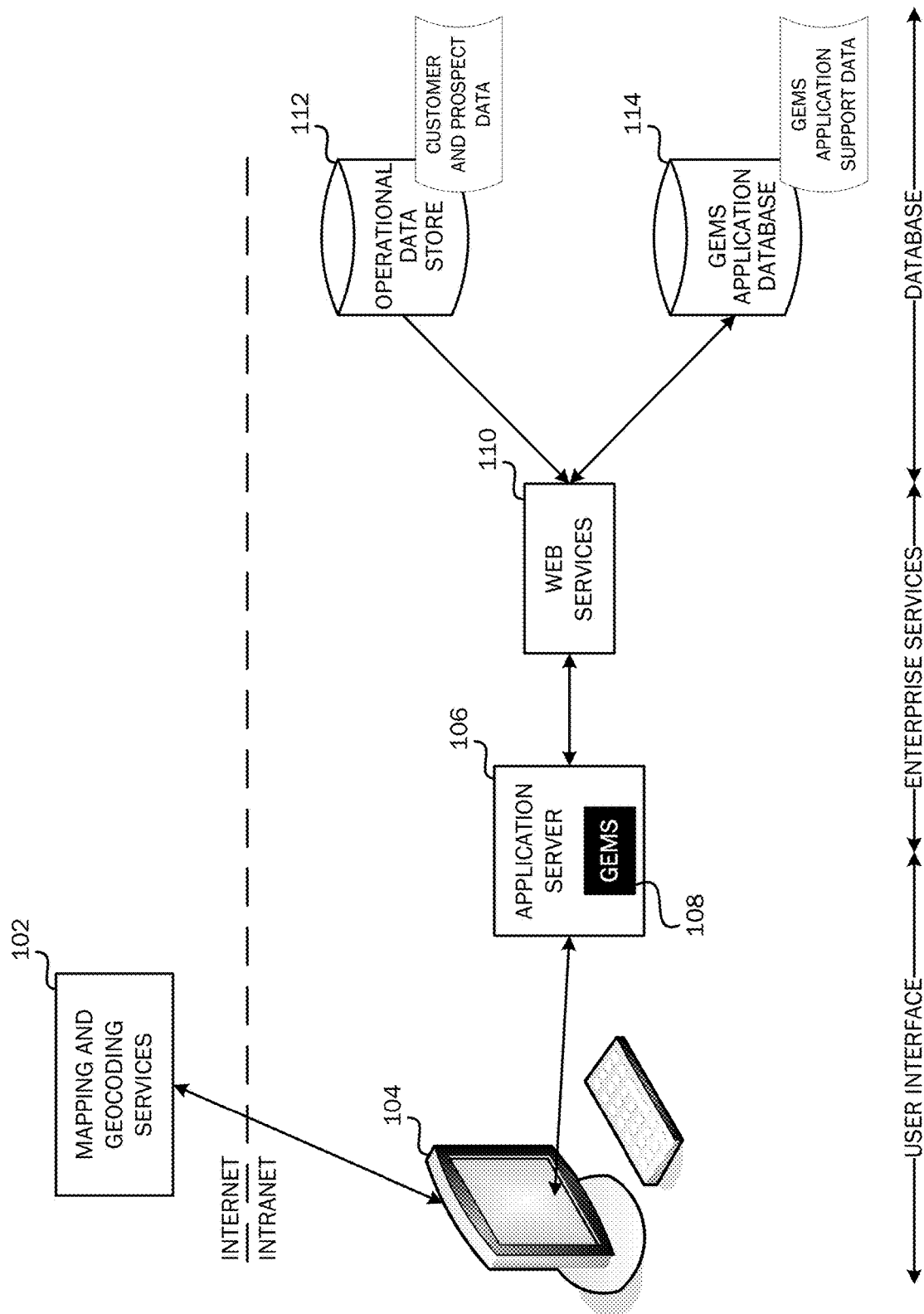
FIG. 1 is a simplified block diagram of a system architecture in which embodiments of the invention may be implemented.

According to embodiments, a web-based mapping service application may be utilized in conjunction with data from a service provider's database to estimate a cost for extending a service provided by the service provider (e.g., cable television service) to a specified location or point of interest. Sometimes, extending a service to a given location may not be viable for a service provider if the cost of extending the service exceeds a threshold cost value or limit as defined by the provider. Embodiments of the present invention provide for determining a serviceability and profitability of a potential customer, and to locate prospective customers.

According to embodiments, an address of a point of interest may be entered into the GEMS application, wherein the address may be checked and displayed on a web-based map interface. A search radius may be applied, wherein a database may be queried for data associated with an area inside the search radius. Results may be displayed on the map interface, wherein a line drawing tool may be utilized to estimate a length of cable that may need to be expanded to the point of interest. The line length estimate may be utilized, in addition to other parameters, to calculate a specified value associated with the extension of service to the point of interest. The value may be utilized to determine if providing service to the point of interest may be cost effective for the service provider, or if a customer may be willing to pay associated costs with receiving the service.

The following detailed description refers to the accompanying drawings. Wherever possible, the same reference numbers are used in the drawings and the following description to refer to the same or similar elements. While embodiments of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention, but instead, the proper scope of the invention is defined by the appended claims.

Referring now to FIG. 1, a high-level system architecture of embodiments of the present invention is illustrated. According to embodiments, a mapping and geocoding service 102 (e.g., GOOGLE MAPS) may be utilized for mapping and geocoding. Geocoding is the process of converting a street address (e.g., 123 Main Street, Atlanta, Ga.) into geographic coordinates (e.g., Latitude: 33° 45' 1.2398" and Longitude: −84° 22' 54.9631"). Geographic coordinates may be utilized to place markers on a map interface or to position a map interface. An application programming interface (API) may access the mapping and geocoding service 102.

Communication may proceed over a message-oriented communications protocol (e.g., Hypertext Transfer Protocol Secure (HTTPS)) from a user client machine 104 to a mapping and geocoding service 102 server. A mapping and geocoding service 102 API may allow for the mapping and geocoding service to be embedded in a web page. The API may provide a number of utilities for manipulating maps, and for adding content to the map through a variety of services.

A dynamic, interactive web experience may be provided to a user via a user interface on a client machine 104. A Geo-spatial Enterprise Mapping System (GEMS) application 108 may be web-based, and accessed by a user via a Uniform Resource Locator (URL). According to an embodiment, when the URL is accessed, authentication via an authentication protocol may be performed by an application server 106. A determination may be made whether a user is authorized to access the GEMS application 108. Upon successful authentication and authorization, a map view may be presented to the user. The user may enter a geocode address or street address of a POI, or by selecting a point location on the map to call to the mapping and geocoding service API 102. The map may center on the entered or selected address.

According to embodiments, a user may specify a radius for searching, wherein further searches may be constrained within this radius from the entered or selected address. The located address and radius may be displayed on the map. The user may choose to display one or more of a number of datasets. Datasets may include, but are not limited to, taps, nodes, fiber spans, hybrid fiber-coaxial (HFC) spans, residential customers, commercial customers, and prospective customers. Data for the datasets may be retrieved from an operational data store 112, and accessed via a web services system 110. The application server 106 and web services system 110 will be described in greater detail with reference to FIG. 7.

Figure 2:
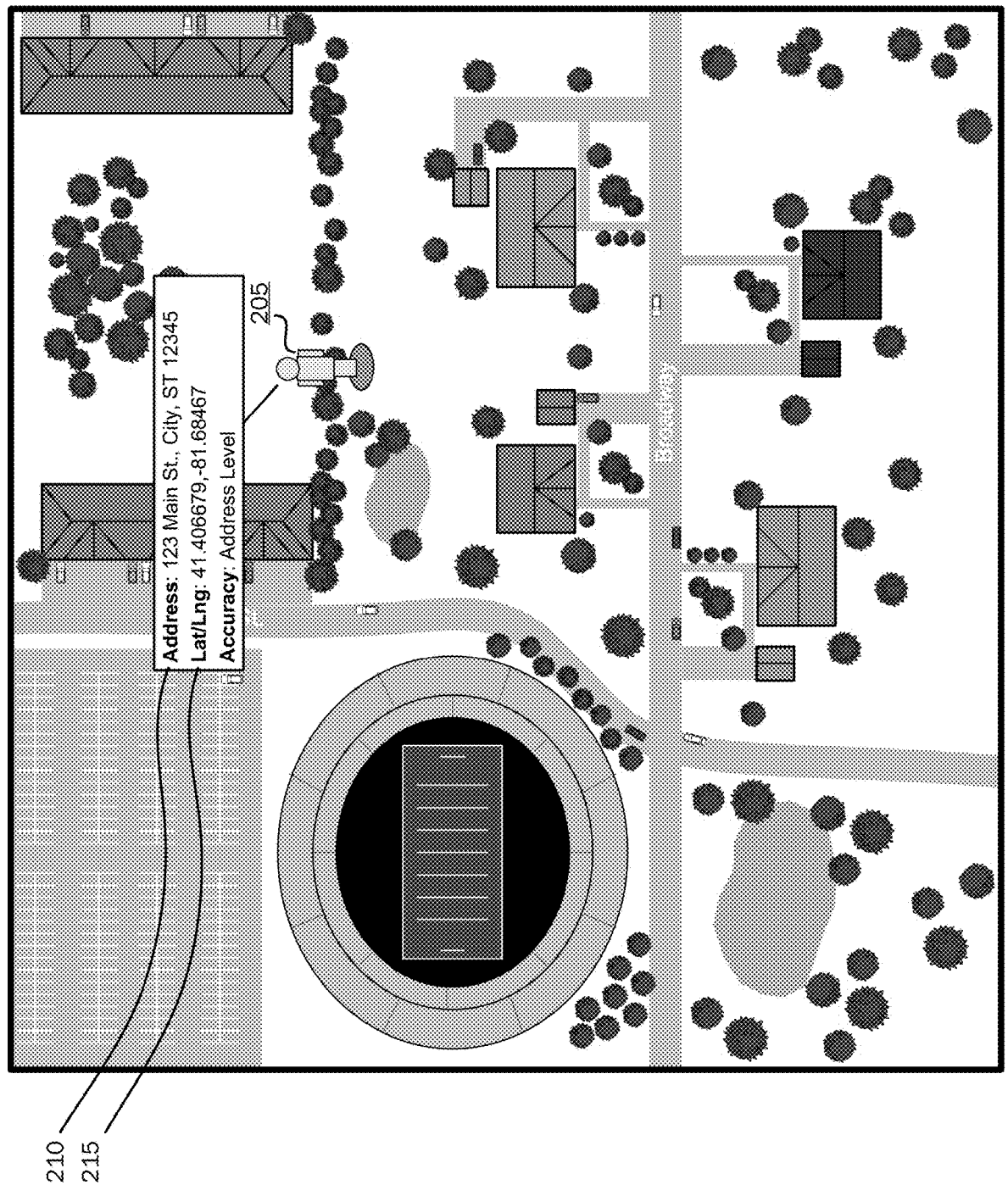
FIG. 2 is an illustration of a map interface 200 with a POI 205 displayed.

One factor in determining a cost for providing service to a POI is knowing a location of the POI and determining a distance to a nearest ingress to the service provider network. According to an embodiment, a web-based map interface 200 may be utilized to aid in determining distances from a POI to a nearest ingress to the service provider network. Referring now to FIG. 2, an illustration of a POI 205 displayed on a web-based map interface 200 is shown. The web-based map 200 may be provided by a mapping and geocoding service 102 as was described with reference to FIG. 1. As was briefly described above, when a user enters a geocode address or street address of a POI, or selects a point location on a map interface, a mapping and geocoding service API 102 may be called upon for map and geocoding data. A map may be displayed on a user's display device 104 centered on the entered or selected address. Images of natural and man-made features (e.g., trees, ponds, buildings, roadways, swimming pools, etc.) may be displayed on the map interface 200. By being able to view such features, a user may be able to identify features that may interfere or affect a routing of cables, wires, or other service provision means to a tap or ingress. As is understood by those skilled in the art, a tap (for example, a cable services tap) may be any point where a cable drop connects to a cable services line (wire or optical fiber or coaxial cable). A node may be a central point to which services are delivered and from which services span out to various taps. For example, a services node may be located in a neighborhood and service lines may extend from the node to taps located at various homes for delivering service to the various homes.

According to embodiments, a POI 205 may be a point location at which a provision of service is being considered. Consideration for a provision of a service may be generated from an inquiry of a potential new customer, from an inquiry of an existing customer of another service type, or may be an in-house inquiry. A POI 205 may be established by entering a geocode address 215 of the POI, by entering a street address 210 of the POI 205, or by selecting a point location on a map interface 200. A POI 205 may be represented on the point location on the displayed map interface 200 by a marker icon, such as a man icon as illustrated in FIG. 2. As shown in FIG. 2, the street address and the geocode address may also be displayed on the map interface 200.

According to embodiments, different views may be applied to the map 200. A map view may be a graphical representation of an area, which may include street names. It may not include a pictorial view of an area. A satellite view may be a pictorial view as taken from a satellite or aerial photography taken from an airplane. A hybrid view may be a pictorial view as taken from a satellite or aerial photography taken from an airplane, and may include street names. The map interface 200 in FIG. 2 is illustrated as a hybrid view. A street view may also be provided, wherein a camera view of an area may be shown. By utilizing the street view feature, a user may position the marker icon 205 on the map interface 200 to view the surrounding area. A nearest street to the marker may be shown, wherein the user may check various elements, such as if cables are aerial or underground, or if there may be any special considerations such as intersections or obstacles from the POI 205 to a tap.

Embodiments of the present invention may comprise zoom and panning tools operative to zoom in and out using a zoom feature. A panning tool may allow for a user to pan left, right, up or down. A street view tool may be provided, which may allow for a user to view 360 degrees, look up and down, and zoom in and out.

Figure 3:
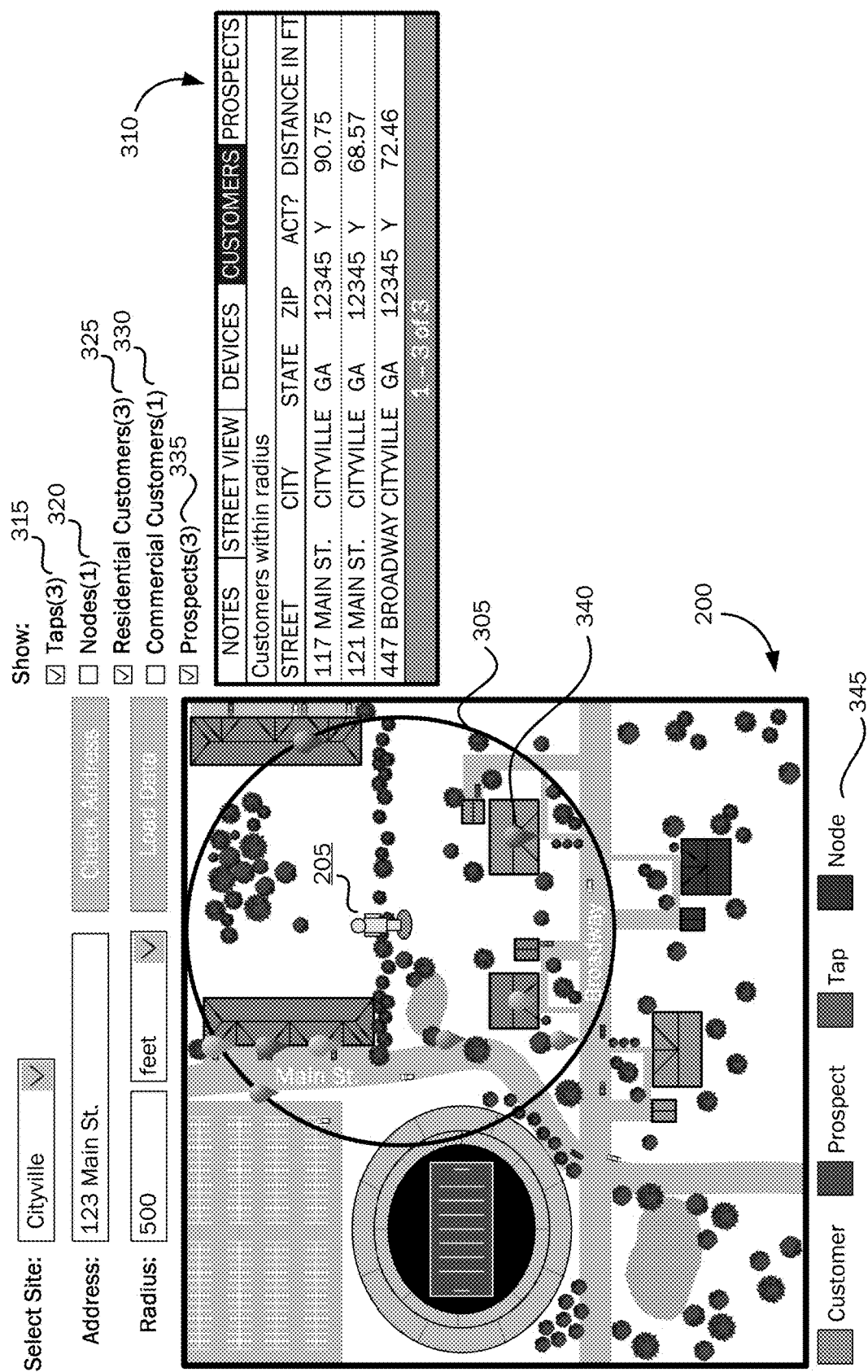
FIG. 3 is an illustration of an applied search radius 305 on a map interface 200 and results of data points and layers within the radius.

According to embodiments, and as shown in FIG. 3, a radius 305 may be applied to a map 200. By applying a radius 305, data associated with items physically within a given radius from a POI 205 may be acquired. Data may be data from an operational data store 112. The operational data store may be a service provider's database, and may include, but is not limited to such information as any devices (taps and nodes) found within a given radius, a distance of each device from the POI 205, a name and type of each device, a node that services each device, a description, and a latitude and longitude position of each device. The latitude and longitude position may be utilized by the mapping and geocoding service 102 to plot a marker for each data point on the map 200. Other data that may be acquired may be customer information, which may include, but is not limited to a customer's address, status, and distance from a POI 205. Customers may be residential or commercial customers. Prospective customer information may also be acquired, which may include a business name (if applicable), address, and distance from a POI 205. Acquired data may be categorized into five layers: taps 315, nodes 320, residential customers 325, commercial customers 330, and prospects 340. Spans may be plotted on the map 200, wherein vertices may be a series of latitudes and longitudes plotted as polylines on the map. A user may request to cluster plotted markers so as not to crowd the map 200 with too many markers. According to an embodiment, a cluster may be selected, wherein the map 200 may be magnified on the selection, and the markers within the cluster may be displayed or re-clustered.

Various radii 305 may be used depending on the application of the GEMS tool. For example, a person in a service provider engineering department may want to have an overview of nodes 320 within a five mile radius 305 because he/she is considering building additional network out without a customer's request. As another example, a salesperson may only be allowed to sell service within two hundred feet of a tap 315. Two hundred feet may be used as a cost limit, wherein the salesperson may enter a two hundred foot radius, conduct a search, and if there are no network elements within two hundred feet of a specified POI 205, he/she may know that he/she will not be able to sell service to the POI.

Each data layer 315, 320, 325, 330, 335 may be switched on or off. Whenever a layer is turned on, data points may appear on the map 200. Information based on a POI 205 and search radius 305 may be displayed in a tab view 310 as illustrated in FIG. 3. Each layer 315, 320, 325, 330, 335 displayed on the map 200 may be distinguishable by various methods such as color coding, distinctive icons, etc. As shown in FIG. 3, each layer 315, 320, 325, 330, 335 is indicated by a marker 340 of a different color. A color or icon key 345 may be provided.

Figure 4:
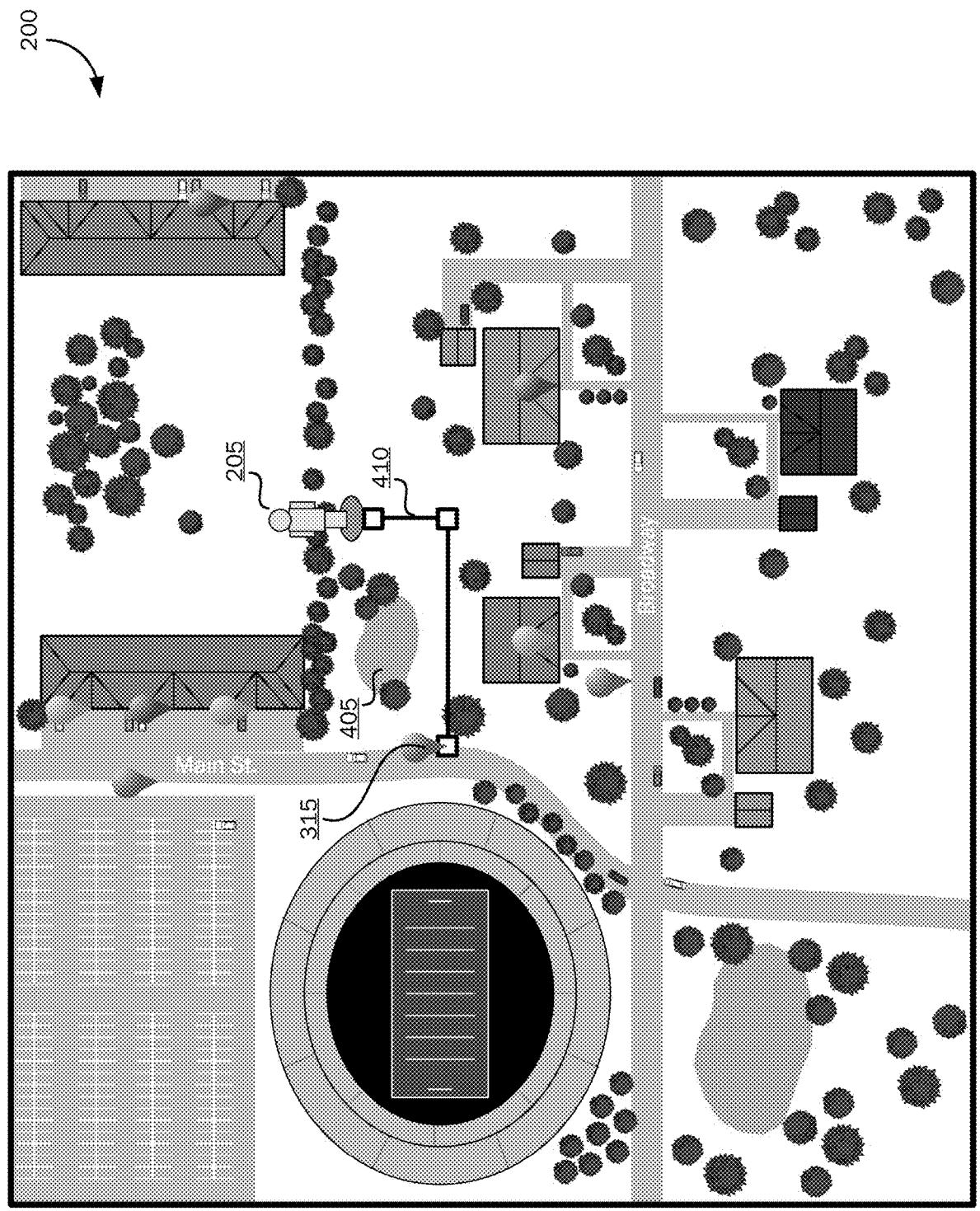
FIG. 4 is an illustration of a map interface 200 showing a line drawing tool 410.

Embodiments of the present invention may comprise a line drawing tool operative to estimate a length of cable required to connect a POI 205 to a nearest tap 315. A user may choose to draw lines on the map 200 to determine a distance between a POI 205 and any other point on the map (e.g., taps, nodes, or spans). By utilizing the hybrid or satellite view feature, along with a street panorama view, a user may be able to see the terrain and obstacles that may require an alternate routing of cables. This may result in a more meaningful and accurate measurement. Referring now to FIG. 4, a nearest tap 315 to the POI 205 is illustrated. Although the shortest route from the POI 205 to the tap 315 is a straight line, a pond 405 is obstructing the path. By utilizing the line drawing tool 410, a user may create an alternate path whereby avoiding obstacles 405 and allowing for a more accurate distance measurement to be obtained. The line drawing tool 410 may allow for as many vertices as needed to turn corners and avoid obstacles to reach a tap 315. According to embodiments, lines may be edited, deleted, and moved. Vertices may be changed, added, deleted, etc.

Embodiments of the present invention may comprise a calculator operative to calculate a cost for running a service from a tap 315 to a POI 205. Line length data as calculated from utilization of the line drawing tool 410 may be fed into the calculator. Other parameters may be applied, including but not limited to, a selection of a district, a selection of aerial or underground cable, and a term length in which a customer may be willing to sign. As should be appreciated, the district selection may apply a correct cost per foot if there is more than one district in an area. According to an embodiment, a district may be automatically selected as determined by location information associated with a POI 205 on the map 200. A selection of aerial or underground cable may be determined by viewing a street view on the map 200.

According to an embodiment, the calculator may be utilized to solve for a monthly recurring cost (MRC). Factors for determining an MRC may include an internal rate of return (IRR) of a specified market and a non-recurring cost (NRC) a customer may be willing to pay. An MRC a customer may need to pay in order for the estimate to meet specified IRR requirements may be determined. A user may manipulate IRR, NRC, and length of contract data to explore different scenarios.

According to another embodiment, the calculator may be utilized to solve for an NRC estimate. Factors for determining an NRC estimate may include an IRR of a specified market and an MRC a customer by be willing to pay. An NRC a customer may need to pay in order for the estimate to meet specified IRR requirements may be determined. A user may manipulate IRR, MRC, and length of contract data to explore different scenarios.

According to another embodiment, the calculator may be utilized to solve for an IRR. An NRC and MRC that a customer may be willing to pay may be entered, and an estimated IRR may be determined. A user may manipulate NRC, MRC, and length of contract data to explore different scenarios.

A user may choose to apply various filters, such as to filter commercial customers or prospect results. Customers may be filtered by renewal period, service types, and type of transport. Prospects may be filtered by proximity to a service provider network, number of lines, and estimated monthly spending on voice and data services. Results may be emailed or printed.

Figure 5:
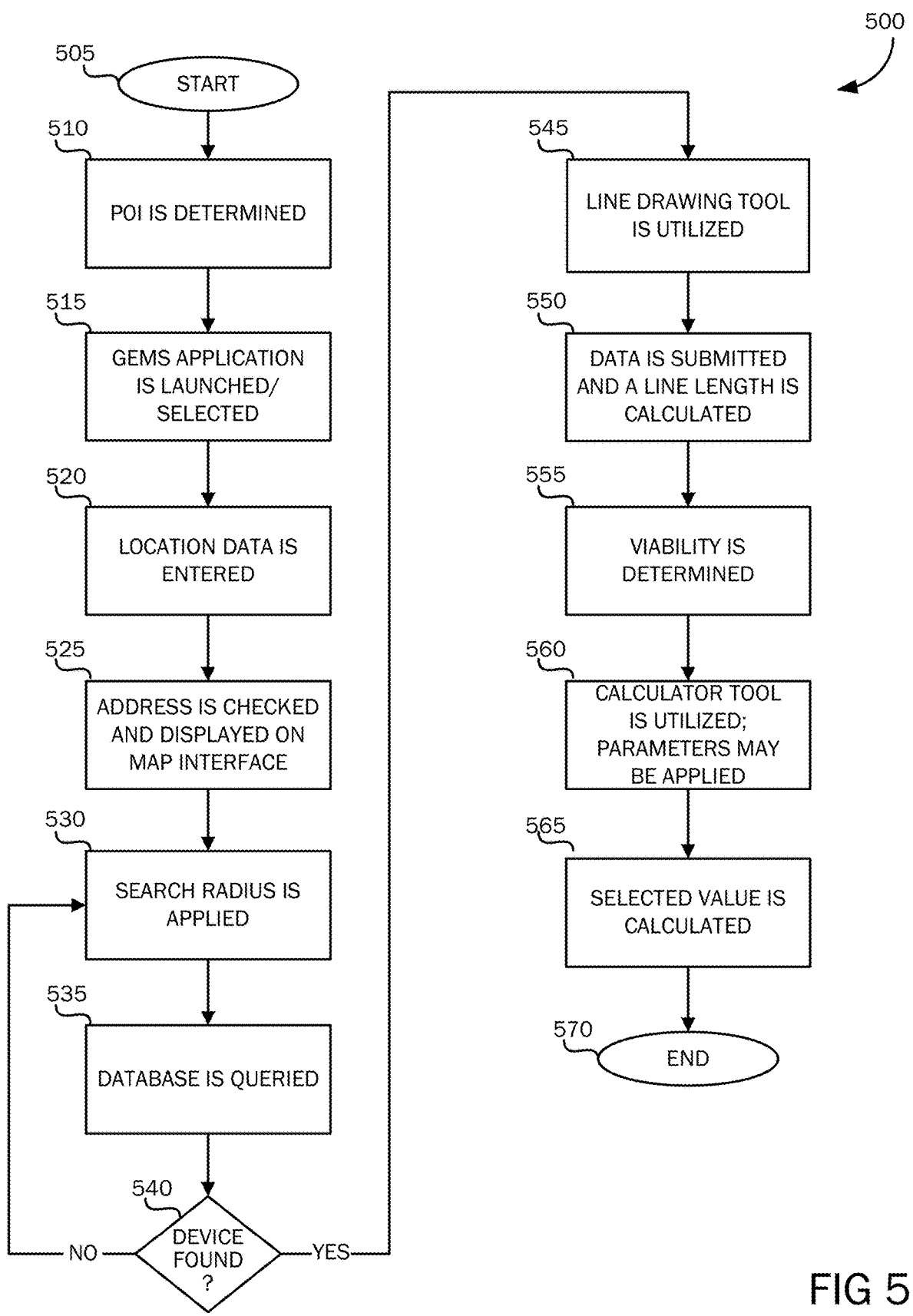
FIG. 5 is a flowchart illustrating a method for determining a serviceability and profitability of a potential service customer and to locate prospective customers.

Having described an exemplary operating environment in which embodiments of the present invention may be implemented and various components and tools of the present invention, FIG. 5 illustrates an example process flow of determining a viability of providing a service to a prospective service provision site at a given point of interest. According to embodiments, the viability of providing the service is determined by calculating costs and returns on investment (profitability) associated with service provision. The method 500 starts at OPERATION 505 and proceeds to OPERATION 510, where a POI 205 is determined. According to embodiments, a location may be determined as a POI 205 because of a variety of factors including, but not limited to, an inquiry by a potential customer or by a existing customer to expand to acquire a service, by a sales representative to determine potential customers or to determine which estimates may be approved immediately or which estimates may have to go through another department, by a person in construction or engineering for consideration of increasing a footprint, etc. For example, a person may contact a service provider inquiring about a service that the service provider may offer. The person may be a commercial entity or a residential entity. The person may contact the service provider via a telephone call, via a web interface, via e-mail, in person, or by other methods. The person may provide an address 210 for a location which he/she would like to inquire about services for, wherein the location is the POI 205 for a given estimate or inquiry.

The routine 500 proceeds to OPERATION 515, where a GEMS application 108 is selected and opened by a user. As described above, the GEMS application 108 may be web-based and accessed via a URL. When the URL is accessed, an authentication process may be performed by an application server 106, and a determination may be made as to whether a user is authorized to use the application 108. Upon successful authentication and authorization, a map view may be presented to the user. The map view may be reloaded with the user's preferred site center address.

The method proceeds to OPERATION 520, where location data may be entered and received by the GEMS application. According to embodiments, location data may be entered as a geocode address 215 of the POI 205, as a street address 210 of the POI 205, or by selecting a point location on a map interface 200.

Once location data is entered or selected, at OPERATION 525, the point of interest may be displayed on a graphical representation on a computer-generated map as described herein. That is, the address may be located on the map 200 via calls to a mapping and geocoding services API 102. The address may be checked, and an indication of the geocoded address (e.g., icon, marker, etc.) may be displayed centered on the POI 205 on a web-based map interface 200. According to embodiments and as shown in FIG. 2, a bubble may be displayed containing the POI address 210, latitude/longitude coordinates 215, and accuracy level. The map 200 may be displayed as a map view, satellite view, or a hybrid view as described above.

At OPERATION 530, a radius 305 may be applied to determine a service area about the point of interest defined by a prescribed radius extending out from the point of interest. According to embodiments, a radius 305 is a measurement from a POI 205 which may be utilized as a constraint for data obtained from a data services system 112. That is, an entered radius 305 may be defined as a special attribute in a database set, wherein only items that are physically within that radius 305 from the centroid (POI 205) may be returned as a data set. The radius 305 may be displayed on the map 200.

The method 500 proceeds to OPERATION 535, where a data store 112 may be queried for data associated with an area (service area) within the defined radius 305 from the POI 205. Data may include customer and prospect data, and may include data associated with one or more service devices located in the service area (e.g., taps 315 and nodes 320) from which service may be extended to the point of interest. Data may also include information on residential customers 325, commercial customers 330, and prospects 335 located in the service area defined by the applied radius. The data may be constrained to the defined radius 305. Each data point may have a latitude and longitude provided in a source table. The latitude and longitude data may be utilized by the mapping and geocoding services API 102 to plot a marker for each data point on the map 200 as shown in FIG. 3. Data may also be listed in a tab view 310 as also shown in FIG. 3.

At DECISION OPERATION 540, a determination may be made as to whether a tap 315, node 320, residential customer 325, commercial customer 330, or prospect 335 is found within the search radius 305. Depending upon the application of use, the user may wish to determine if a particular device 315, 320 is located within the search radius 305, or if a customer 325, 330 or prospective customer 335 may be located within the search radius. If there are no data points 315, 320, 325, 330, 335 within the search radius, at OPERATION 330, the method may return to OPERATION 530, where an alternative radius 305 may be applied.

If there are available devices 315, 320 or existing or prospective customers 325, 330, 335 found within the search radius 305, the method proceeds to OPERATION 545, where the user may utilize a line drawing tool 410 to estimate a distance from the POI 205 to a nearest logical service device (e.g., tap 315). Referring back to FIG. 4, a line drawing tool 410 path is illustrated from a POI 205 to a tap 315. Through the use of the web based mapping system's imagery views, obstacles which may impede a direct path to a tap 315 may be visible, wherein the user may draw a route around such obstacles through utilization of the line drawing tool 410. According to embodiments, multiple vertices may be allowed, so that a path from a POI 205 to a tap 315 created with the line drawing tool 410 may be a relatively close representation of an actual path of running service cables.

At OPERATION 550, data is submitted, and a line length is calculated. The calculated line length may be displayed, so that the user may view the result.

At OPERATION 555, a viability of the line length estimate may be determined. According to embodiments, the length of the line may be utilized as a factor to categorize the estimate as a viable estimate, as an estimate that should be conducted by Engineering, or as an estimate that is too costly and thus not viable.

The method proceeds to OPERATION 560, where a viable line length estimate may be utilized as a parameter for calculating a cost for providing a service to a POI 205. Other parameters that may be applied may include, but are not limited to, the type of cable used, any special equipment costs associated with the service construction, a specified district, a term of service a customer may be willing to agree to, etc.

According to one embodiment, costs associated with a number of potential services lines from one or more service devices (e.g., taps, nodes, etc.) in the service area to the point of interest may be determined, and the costs for each potential line may be compared to a revenue associated with service provision along each line. A determination may be made as to whether the costs associated with each potential line of service overcome the revenues to generate a profitability that exceeds a required threshold. As should be understood, a required return on investment threshold may be varied based on the requirements of a given service provider. For example, in some circumstances, a negative return on investment may be acceptable to a service provider if providing the service causes downstream profitability (for example, if additional services are provided in the service area owing to the provision of an initial service line). A given service line from a given service device to the point of interest may be designated as the line from which a desired service may be provided to the point of interest if the costs versus revenues are acceptable or otherwise desirable to the service provider.

In addition, as described herein, the user may choose to solve for an internal rate of return value, a nonrecurring cost value, or a recurring cost value, depending upon what information may be known. If an internal rate of return (IRR) value and nonrecurring cost (NRC) value are known, the calculator may be used to solve for a monthly recurring cost that a customer may need to pay in order for the estimate to meet the internal rate of return requirement. If an internal rate of return (IRR) value and monthly-recurring cost (MRC) value are known, the calculator may be used to solve for a non-recurring cost (NRC) a customer may need to pay in order for the estimate to meet the internal rate of return requirement. If an MRC value and an NRC value that a customer may be willing to pay are known, the calculator may be used to solve for an internal rate of return estimate.

At OPERATION 565, the selected value is calculated. Entered and calculated values may be entered in a Notes tab. According to embodiments, a variety of information may be entered in the Notes tab including, but not limited to, a customer or prospect name, contact information, cost per foot, aerial or underground cable, IRR, NRC, and MRC values, estimated line length, line color, each of the vertices, and the latitude and longitude of each vertex. Results may be e-mailed or otherwise communicated to another party. The method ends at OPERATION 570.

Figure 6:
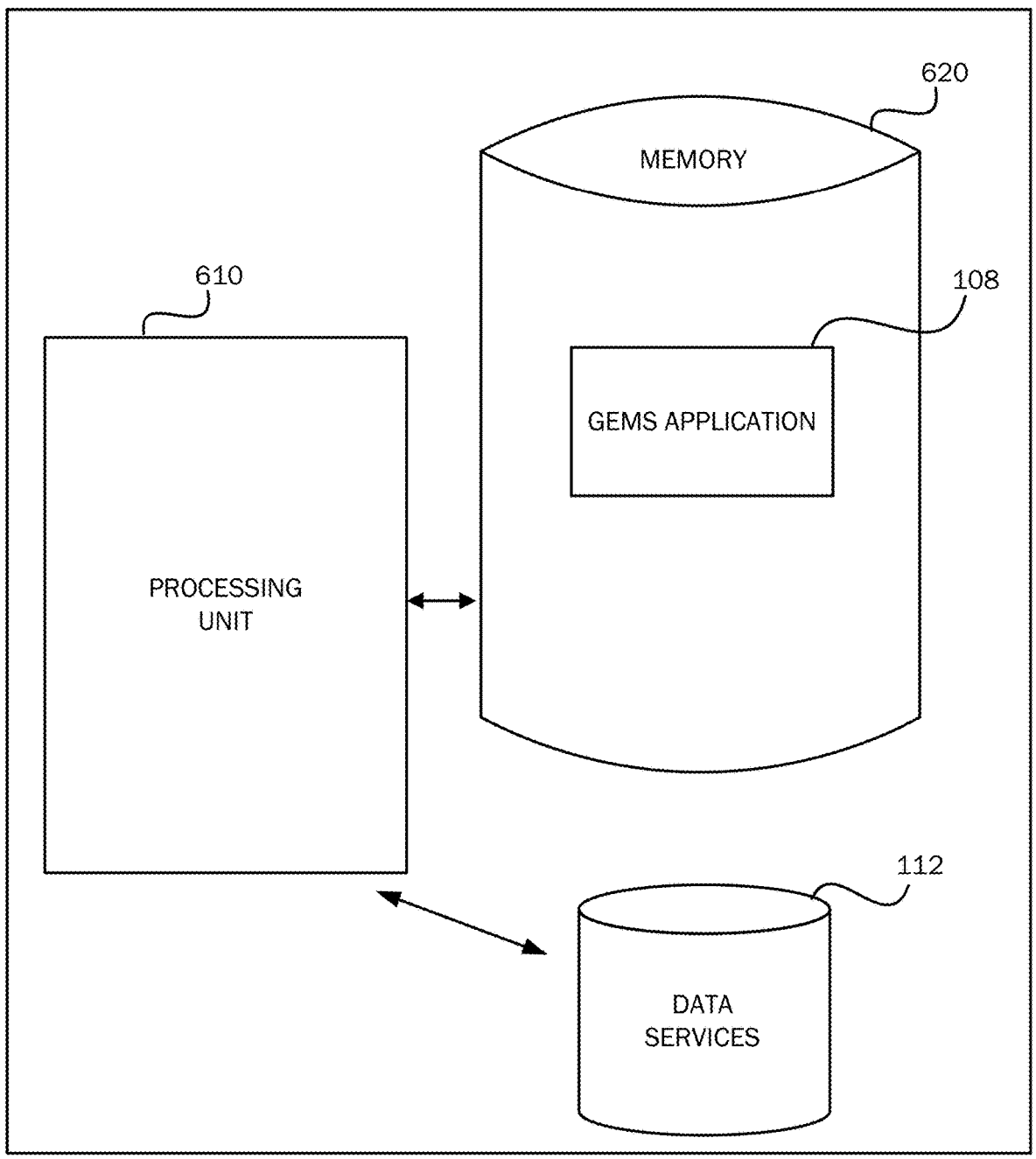
FIG. 6 is a block diagram of a system including a computing device with which embodiments of the invention may be implemented.

With reference to FIG. 6, a system consistent with an embodiment of the invention may include a computing device, such as computing device 104. Computing device 104 may include a processing unit 610 and a memory unit 620. Memory 620 may include, for example, a GEMS Application Module 108 and a data store 640. While executing on processing unit 610, GEMS Application Module 108 may perform processes for retrieving various data services systems information, including, for example, one or more operations included in a method 500 described above with respect to FIG. 5.

Computing device 600 may be implemented using a personal computer, a network computer, a mainframe, or other similar microcomputer-based workstation. The processor may comprise any computer operating environment, such as hand-held devices, multiprocessor systems, microprocessor-based or programmable sender electronic devices, minicomputers, mainframe computers, and the like. The processor may also be practiced in distributed computing environments where tasks are performed by remote processing devices. Furthermore, the processor may comprise a mobile terminal, such as a smart phone, a cellular telephone, a cellular telephone utilizing wireless application protocol (WAP), personal digital assistant (PDA), intelligent pager, portable computer, a hand held computer, a conventional telephone, a wireless fidelity (Wi-Fi) access point, or a facsimile machine. The aforementioned systems and devices are examples and the processor may comprise other systems or devices.

Figure 7:
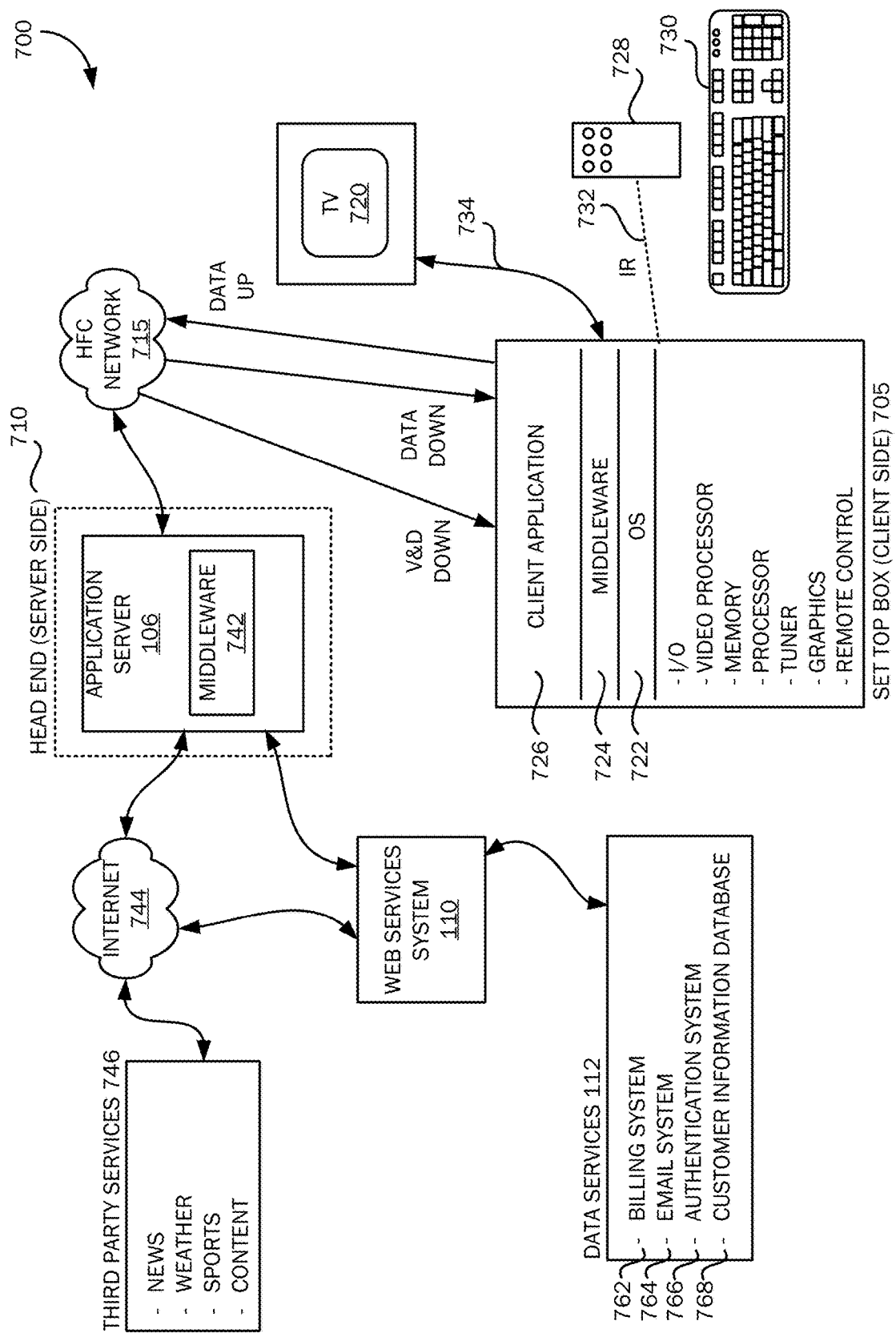
FIG. 7 is a simplified block diagram of a cable services system architecture 700 in which embodiments of the invention may be implemented.

FIG. 7 is a simplified block diagram illustrating a cable services system (hereafter referred to as "CATV") architecture that serves as an exemplary operating environment for embodiments of the present invention. As has been described, embodiments of the present invention provide for a system and method for determining a serviceability and profitability of a potential customer and to locate prospective customers. An estimated cost for a service provided by a service provider to a specified location or point of interest 205 may be determined by utilizing a mapping and geocoding service 102 in conjunction with customer and prospect data 112. Determining a serviceability and profitability of a potential customer and to locate prospective customers for CATV services is one example of a variety of services for which a service provider may utilize embodiments of the present invention.

A CATV system is described in detail herein. Referring now to FIG. 7, digital and analog video programming, information content and interactive television services are provided via a hybrid fiber coax (HFC) network 715 to a television set 720 for consumption by a cable television/services system customer. As is known to those skilled in the art, HFC networks 715 combine both optical fiber and coaxial cable lines. Typically, optical fiber runs from the cable head end 710 to neighborhoods of 500 to 2,000 customers. Coaxial cable runs from the optical fiber feeders to each customer. According to embodiments of the present invention, the functionality of the HFC network 715 allows for efficient bidirectional data flow between the client-side set-top box 705 and the server-side application server 106 of the present invention.

According to embodiments of the present invention, the CATV system 700 is in the form of a distributed client-server computing system for providing video and data flow across the HFC network 715 between server-side services providers (e.g., cable television/services providers) via a server-side head end 710 and a client-side customer via a client-side set-top box (STB) functionally connected to a customer receiving device, such as the television set 720. As should be appreciated, functionality of a STB may reside in a stand-alone device, or alternatively, be performed by hardware resident elsewhere, such as within a television or by a suitably equipped terminal device. As is understood by those skilled in the art, modern CATV systems 700 may provide a variety of services across the HFC network 715 including traditional digital and analog video programming, telephone services, high speed Internet access, video-on-demand, and information services.

On the client side of the CATV system 700, digital and analog video programming and digital and analog data are provided to the customer television set 720 via the set-top box (STB) 705. Interactive television services that allow a customer to input data to the CATV system 700 likewise are provided by the STB 705. As illustrated in FIG. 7, the STB 705 is a multipurpose computing device having a computer processor, memory and an input/output mechanism. The input/output mechanism receives input from server-side processes via the HFC network 715 and from customers via input devices such as the remote control device 728 and the keyboard 730. The remote control device 728 and the keyboard 730 may communicate with the STB 705 via a suitable communication transport such as the infrared connection 732. The STB 705 also includes a video processor for processing and providing digital and analog video signaling to the television set 720 via a cable communication transport 734. A multi-channel tuner is provided for processing video and data to and from the STB 705 and the server-side head end system 710, described below.

The STB 705 also includes an operating system 722 for directing the functions of the STB 705 in conjunction with a variety of client applications 726. For example, if a client application 726 requires a news flash from a third-party news source to be displayed on the television 720, the operating system 722 may cause the graphics functionality and video processor of the STB 705, for example, to output the news flash to the television 720 at the direction of the client application 726 responsible for displaying news items.

Because a variety of different operating systems 722 may be utilized by a variety of different brands and types of set-top boxes, a middleware layer 724 is provided to allow a given software application to be executed by a variety of different operating systems. According to an embodiment of the present invention, the middleware layer 724 may include a set of application programming interfaces (API) that are exposed to client applications 726 and operating systems 722 that allow the client applications to communicate with the operating systems through common data calls understood via the API set. As described below, a corresponding middleware layer 742 is included on the server side 710 of the CATV system 700 for facilitating communication between the server-side application server and the client-side STB 705. According to one embodiment of the present invention, the middleware layer 742 of the server-side application server and the middleware layer 724 of the client-side STB 705 format data passed between the client side and server side according to the Extensible Markup Language (XML). As should be appreciated, XML is only one example of data formatting, data passed between the client side and the server side may be formatted according to any other suitable formatting language or standard.

According to one embodiment, the set-top box 705 passes digital and analog video and data signaling to the television 720 via a one-way communication transport 734. According to another embodiment, bidirectional communication may be accomplished between the STB 705 and the television

720. For example, high-definition multimedia interface (HDMI) ports on the STB 705 and television 720 allow for bidirectional data communications between the devices. The STB 705 may receive video and data from the server side of the CATV system 700 via the HFC network 715 through a video/data downlink and data via a data downlink. The STB 705 may transmit data from the client side of the CATV system 700 to the server side of the CATV system 700 via the HFC network 715 via one data uplink. The video/data downlink is an "in band" downlink that allows for digital and analog video and data signaling from the server side of the CATV system 700 through the HFC network 715 to the set-top box 705 for use by the STB 705 and for distribution to the television set 720. The "in band" signaling space may operate at a variety of frequencies. According to one embodiment, the "in band" signaling space may operate at a frequency between 54 and 1000 megahertz. The signaling space between 54 and 860 megahertz is generally divided into 6 megahertz channels in which may be transmitted a single analog signal or a greater number (e.g., up to ten) digital signals.

The data downlink and the data uplink, illustrated in FIG. 7, between the HFC network 715 and the set-top box 705 comprise "out of band" data links. As is understand by those skilled in the art, the "out of band" frequency range generally lies between zero and 54 megahertz. According to embodiments of the present invention, data flow between the client-side set-top box 705 and the server-side application server 106 is typically passed through the "out of band" data links. Alternatively, an "in band" data carousel may be positioned in an "in band" channel into which a data feed may be processed from the server-side application server 106 through the HFC network 715 to the client-side STB 705. Operation of data transport between components of the CATV system 700, described with reference to FIG. 7, is well known to those skilled in the art.

According to one embodiment data passed between the CATV system backend components such as the head end 710 and the CATV system front end components such as the STB 705 may be passed according to the Data Over Cable Service Interface Specification (DOCSIS). As is well known to those skilled in the art, DOCSIS provides for a mechanism for data transport over a cable system such as the CATV 700, illustrated in FIG. 7. Among other things, DOCSIS allows for the passing of digital communications and Internet connectivity over an HFC network 715.

Referring still to FIG. 7, the head end 710 of the CATV system 700 is positioned on the server side of the CATV system and includes hardware and software systems responsible for originating and managing content for distributing through the HFC network 715 to client-side STBs 705 for presentation to customers via televisions 720. As described above, a number of services may be provided by the CATV system 700, including digital and analog video programming, interactive television services, telephone services, video-on-demand services, targeted advertising, and provision of information content.

The application server 106 is a general-purpose computing system operative to assemble and manage data sent to and received from the client-side set-top box 705 via the HFC network 715. As described above with reference to the set-top box 705, the application server 106 includes a middleware layer 742 for processing and preparing data from the head end of the CATV system 700 for receipt and use by the client-side set-top box 705. For example, the application server 106 via the middleware layer 742 may obtain data from third-party services 746 via the Internet 744 for transmitting to a customer through the HFC network 715 and the set-top box 705. For example, a weather report from a third-party weather service may be downloaded by the application server via the Internet 744. When the application server 106 receives the downloaded weather report, the middleware layer 742 may be utilized to format the weather report for receipt and use by the set-top box 705. According to one embodiment of the present invention, data obtained and managed by the middleware layer 742 of the application server 106 is formatted according to the Extensible Markup Language and is passed to the set-top box 705 through the HFC network 715 where the XML-formatted data may be utilized by a client application 726 in concert with the middleware layer 724, as described above. As should be appreciated by those skilled in the art, a variety of third-party services data, including news data, weather data, sports data and other information content may be obtained by the application server 106 via distributed computing environments such as the Internet 744 for provision to customers via the HFC network 715 and the set-top box 705.

According to embodiments of the present invention, the application server 106 obtains customer profile data from services provider data services 112 for preparing a customer profile that may be utilized by the set-top box 705 for tailoring certain content provided to the customer. As illustrated in FIG. 7, the services provider data services 112 include a number of services operated by the services provider of the CATV system 700 which may include data on a given customer. For example, a billing system 762 may include information such as a customer's name, street address, business identification number, Social Security number, credit history, and information regarding services and products subscribed to by the customer. An electronic mail system 764 may contain information such as electronic mail addresses, high-speed Internet access subscription information and electronic mail usage data. An authentication system 766 may include information such as secure user names and passwords utilized by customers for access to network services. The customer information database 768 may include general information about customers such as place of employment, business address, business telephone number and demographic information such as age, gender, educational level, and the like. As should be understood by those skilled in the art, the disparate data services systems 762, 764, 766, 768 are illustrated as a collection of data services for purposes of example only. The example data services systems comprising the data services 112 may operate as separate data services systems, which communicate with a web services system (described below) along a number of different communication paths and according to a number of different communication protocols.

Referring still to FIG. 7, a web services system 110 is illustrated between the application server 106 and the data services 112. According to embodiments of the present invention, the web services system 110 serves as a collection point for data requested from each of the disparate data services systems comprising the data services 112. When the application server 106 requires customer profile data from one or more of the data services 112 for preparation or update of a customer profile, the application server 106 passes a data query to the web services system 110. The web services system formulates a data query to each of the available data services systems for obtaining any available data for a given customer as identified by a set-top box identification associated with the customer. The web services system 110 serves as an abstraction layer between the various data services systems and the application server 106.

That is, the application server 106 is not required to communicate with the disparate data services systems, nor is the application server 106 required to understand the data structures or data types utilized by the disparate data services systems. The web services system 110 is operative to communicate with each of the disparate data services systems for obtaining necessary customer profile data. The customer profile data obtained by the web services system is assembled and is returned to the application server 106 for ultimate processing via the middleware layer 742, as described above.

Embodiments of the present invention, for example, are described above with reference to block diagrams and/or operational illustrations of methods, systems, and computer program products according to embodiments of the invention. The functions/acts noted in the operations may occur out of the order as shown in any flowchart. For example, two operations shown in succession may in fact be executed substantially concurrently or the operations may sometimes be executed in the reverse order, depending upon the functionality/acts involved.

While certain embodiments of the invention have been described, other embodiments may exist. Furthermore, although embodiments of the present invention have been described as being associated with data and computer-executable steps or operations stored in memory and other storage mediums, data and computer-executable steps or operations can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the invention.

While the specification includes examples, the invention's scope is indicated by the following claims. Furthermore, while the specification has been described in language specific to structural features and/or methodological acts, the claims are not limited to the features or acts described above. Rather, the specific features and acts described above are disclosed as example for embodiments of the invention. It will be apparent to those skilled in the art that various modifications or variations may be made in the present invention without departing from the scope or spirit of the invention. Other embodiments of the invention will be apparent to those skilled in the art from consideration of the specification and practice of the invention disclosed herein.

We claim:

1. A method for determining whether to provide service from an existing service device to a prospective customer at a given point of interest, comprising:
    receiving location data for a point of interest that is without service from a service provider, wherein the point of interest corresponds to a prospective customer;
    displaying a graphical representation of the point of interest at a position on a computer-generated map based on the location data for the point of interest;
    extending a search radius out from the point of interest to determine a proposed service area for the prospective customer;
    locating a service device of the service provider within the search radius that is already providing service for an existing customer;
    querying a database for location data for the service device;
    displaying a graphical representation of the service device at a position on the computer-generated map based on the location data for the service device;
    automatically determining and displaying a path for routing a service cable from the service device to the point of interest, wherein the path routes around visible and non-visible obstacles;
    calculating a length of the path between the service device and the point of interest; and
    determining whether to provide service to the prospective customer via the service device based on an internal rate of return for the service provider, wherein the internal rate of return is determined using a combination of:
        a monthly recurring cost for the prospective customer,
        a non-recurring cost for the prospective customer,
        the length of the path,
        one or more districts present in an area of the point of interest determined based on the location data for the point of interest, each of the one or more districts having an associated cost per foot to be applied,
        a type of the service cable to be routed along the path,
        an equipment cost associated with laying the service cable, and
        a term of service for the prospective customer, including a length of the term of service.

2. The method of claim 1, further comprising:
    prior to displaying the graphical representation of the point of interest on the computer-generated map, passing the location data for the point of interest to a mapping and geocoding services application for displaying the graphical representation of the point of interest.

3. The method of claim 2, wherein the mapping and geocoding services application is a geo-spatial enterprise mapping system (GEMS) application operative to call a mapping and geocoding services application programming interface (API).

4. The method of claim 3, wherein the mapping and geocoding services API is an implementation of a programming language that accesses web-based mapping and geocoding services.

5. The method of claim 2, wherein displaying the path from the service device to the point of interest comprises:
    displaying the path via a line drawing tool for determining a distance between the point of interest and the service device.

6. The method of claim 1, wherein receiving location data for the point of interest includes receiving one of a street address, a geocode address, or a selection of a point on a map interface.

7. The method of claim 1, further comprising:
    displaying data relevant to the service area within the search radius in a tab view adjacent to the computer-generated map.

8. The method of claim 7, wherein the data relevant to the service area within the search radius includes data associated with the existing customer and data associated with the prospective customer.

9. The method of claim 1, wherein determining whether to provide service to the prospective customer via the service device is further based on a potential for downstream profitability when the internal rate of return for the service provider is negative.

10. The method of claim 9, wherein the downstream profitability is based on a potential to provide additional services in the service area as a result of laying the service cable.

11. A system for determining whether to provide service from an existing service device to a prospective customer at a given point of interest, the system comprising:
a processing unit; and
a memory storing instructions comprising a geo-spatial enterprise mapping system (GEMS) application that, when executed by the processing unit, cause the system to:
receive location data for a point of interest that is without service from a service provider, wherein the point of interest corresponds to a prospective customer;
call a mapping and geocoding services application programming interface (API);
display a map interface centered on the point of interest, the point of interest at a position on the map interface based on the location data for the point of interest;
determine a proposed service area for the prospective customer;
locate a service device of the service provider that is already providing service for an existing customer;
automatically determine and display a path for routing a service cable from the service device to the point of interest, wherein the path routes around visible and non-visible obstacles;
calculate a length of the path between the service device and the point of interest; and
determine whether to provide service to the prospective customer via the service device based on an internal rate of return for the service provider, wherein the internal rate of return is determined using a combination of:
a monthly recurring cost for the prospective customer,
a non-recurring cost for the prospective customer,
the length of the path,
one or more districts present in an area of the point of interest determined based on the location data for the point of interest, each of the one or more districts having an associated cost per foot to be applied,
a type of the service cable to be routed along the path,
an equipment cost associated with laying the service cable, and
a term of service for the prospective customer, including a length of the term of service.

12. The system of claim 11, wherein the mapping and geocoding services API is an implementation of a programming language that accesses web-based mapping and geocoding services.

13. The system of claim 11, wherein receiving location data for the point of interest includes receiving one of a street address, a geocode address, or a selection of a point on the map interface.

14. The system of claim 11, further comprising:
displaying data relevant to the service area within the search radius in a tab view associated with the map interface.

15. The system of claim 14, wherein the data relevant to the service area within the search radius includes data associated with the existing customer and data associated with the prospective customer.

16. A system for determining whether to provide service from an existing service device to a prospective customer at a given point of interest, comprising:
a processing unit;
a memory that comprises computer executable instructions that, when executed by the processing unit, cause the system to:
receive location data for a point of interest that is without service from a service provider, wherein the point of interest corresponds to a prospective customer;
display a graphical representation of the point of interest at a position on a computer-generated map based on the location data for the point of interest;
extend a search radius out from the point of interest to determine a proposed service area for the prospective customer;
locate a service device of the service provider within the search radius that is already providing service for an existing customer;
query a database for location data for the service device;
display a graphical representation of the service device at a position on the computer-generated map based on the location data for the service device;
automatically determine and display a path for routing a service cable from the service device to the point of interest, wherein the path routes around visible and non-visible obstacles;
calculate a length of the path between the service device and the point of interest; and
determine whether to provide service to the prospective customer via the service device based on an internal rate of return for the service provider, wherein the internal rate of return is determined using a combination of:
a monthly recurring cost for the prospective customer,
a non-recurring cost for the prospective customer,
the length of the path,
one or more districts present in an area of the point of interest determined based on the location data for the point of interest, each of the one or more districts having an associated cost per foot to be applied,
a type of the service cable to be routed along the path,
an equipment cost associated with laying the service cable, and
a term of service for the prospective customer, including a length of the term of service.

17. The system of claim 16, wherein the system is further operative to:
prior to the display of the graphical representation of the point of interest on the computer-generated map, pass the location data for the point of interest to a mapping and geocoding services application for displaying the graphical representation of the point of interest.

18. The system of claim 17, wherein the mapping and geocoding services application is a geo-spatial enterprise mapping system (GEMS) application operative to call a mapping and geocoding services application programming interface (API).

19. The system of claim 18, wherein the mapping and geocoding services API is an implementation of a programming language that accesses web-based mapping and geocoding services.

* * * * *